(12) United States Patent
Lee et al.

(10) Patent No.: US 12,469,906 B2
(45) Date of Patent: Nov. 11, 2025

(54) BATTERY MODULE COMPRISING A FIRE EXTINGUISHER, BATTERY RACK COMPRISING SAME, AND POWER STORAGE DEVICE

(71) Applicant: LG ENERGY SOLUTION, LTD., Seoul (KR)

(72) Inventors: Young-Seok Lee, Daejeon (KR); Sang-Hyun Jo, Daejeon (KR); Ji-Won Jeong, Daejeon (KR); Kyung-Hyun Bae, Daejeon (KR); Jin-Kyu Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1038 days.

(21) Appl. No.: 17/609,993

(22) PCT Filed: Nov. 6, 2020

(86) PCT No.: PCT/KR2020/015553
§ 371 (c)(1),
(2) Date: Nov. 9, 2021

(87) PCT Pub. No.: WO2021/091329
PCT Pub. Date: May 14, 2021

(65) Prior Publication Data
US 2022/0209339 A1 Jun. 30, 2022

(30) Foreign Application Priority Data
Nov. 8, 2019 (KR) .......................... 10-2019-0142955

(51) Int. Cl.
*H01M 50/143* (2021.01)
*H01M 50/211* (2021.01)
*H01M 50/24* (2021.01)

(52) U.S. Cl.
CPC ....... *H01M 50/143* (2021.01); *H01M 50/211* (2021.01); *H01M 50/24* (2021.01)

(58) Field of Classification Search
CPC ... H01M 50/143; H01M 50/24; H01M 50/211
See application file for complete search history.

(56) References Cited

U.S. PATENT DOCUMENTS

2015/0283414 A1\* 10/2015 Chen ...................... A62C 35/68
169/37
2019/0048820 A1 2/2019 Lee et al.

FOREIGN PATENT DOCUMENTS

CN 206700536 U 12/2017
EP 2 851 973 A 3/2015
(Continued)

OTHER PUBLICATIONS

EPO machine generated English translation of JP 2014-090782 A (Year: 2014).\*

(Continued)

*Primary Examiner* — Basia A Ridley
*Assistant Examiner* — Kimberly Wyluda
(74) *Attorney, Agent, or Firm* — Birch, Stewart, Kolasch & Birch, LLP

(57) ABSTRACT

A battery module includes at least one battery cell, a module case configured to accommodate the at least one battery cell, a fire extinguisher disposed at least partially inside the module case and connected to a fire extinguishing tank containing a fire extinguishing agent to inject the fire extinguishing agent directly into the module case when a thermal runaway or fire occurs in the at least one battery cell and an insulation cover configured to cover the fire extinguisher at least partially and disposed at least partially inside the module case.

9 Claims, 8 Drawing Sheets

(56) References Cited

FOREIGN PATENT DOCUMENTS

| | | | |
|---|---|---|---|
| EP | 4 009 414 A1 | | 6/2022 |
| JP | 5-31207 A | | 2/1993 |
| JP | 6-132289 A | | 5/1994 |
| JP | H08173570 A | * | 7/1996 |
| JP | 2009297195 A | * | 12/2009 |
| JP | 2011-115335 A | | 6/2011 |
| JP | 2014-090782 A | | 5/2014 |
| JP | 2015-220177 A | | 12/2015 |
| JP | 2016-92007 A | | 5/2016 |
| JP | 5953925 B2 | | 7/2018 |
| JP | 2019-075191 A | | 5/2019 |
| KR | 20-0277800 Y1 | | 6/2002 |
| KR | 10-2018-0023699 A | | 3/2018 |
| KR | 10-2018-0032122 A | | 3/2018 |
| KR | 10-1866288 B1 | | 6/2018 |
| KR | 10-1869036 B1 | | 7/2018 |
| KR | 10-2018-0092521 A | | 8/2018 |
| KR | 10-2019-0086115 A | | 7/2019 |
| WO | WO 03/076838 A1 | | 9/2003 |

OTHER PUBLICATIONS

EPO machine generated English translation of JP 2009-297195 A (Year: 2009).*
EPO machine generated English translation of JP-H08173570-A (Year: 1996).*
Extended European Search Report for European Application No. 20885150.1, dated Oct. 4, 2023.
International Search Report (PCT/ISA/210) issued in PCT/KR2020/015553, dated Feb. 24, 2021.

* cited by examiner

BATTERY MODULE COMPRISING A FIRE EXTINGUISHER, BATTERY RACK COMPRISING SAME, AND POWER STORAGE DEVICE

TECHNICAL FIELD

The present disclosure relates to a battery module, and a battery rack and an energy storage system including the battery module.

The present application claims priority to Korean Patent Application No. 10-2019-0142955 filed on Nov. 8, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components. Here, according to various voltage and capacity requirements, an energy storage system may be configured to include at least one battery pack that includes at least one battery module.

In the conventional battery module, when a thermal runaway occurs in the battery module, the thermal runaway is continuously transferred among the battery cells inside the battery module, thereby damaging all battery cells.

Therefore, there is a need to find a technique for blocking a thermal runaway when the thermal runaway occurs.

DISCLOSURE

Technical Problem

The present disclosure is directed to providing a battery module, which may block a thermal runaway when the thermal runaway occurs, and a battery rack and an energy storage system including such a battery module.

Technical Solution

In one aspect of the present disclosure, there is provided a battery module, comprising: at least one battery cell; a module case configured to accommodate the at least one battery cell; a fire extinguisher disposed at least partially inside the module case and configured to be connected to a fire extinguishing tank containing a fire extinguishing agent to inject the fire extinguishing agent directly into the module case when a thermal runaway or fire occurs in the at least one battery cell; and an insulation cover configured to at least partially cover the fire extinguisher and disposed at least partially inside the module case.

The insulation cover may be mounted to a rear surface of the module case, and the rear surface of the module case may have an insulation cover mounting portion so that the insulation cover is mounted thereto.

The fire extinguisher may at least partially pass through the module case and be disposed at an inner side of the insulation cover inside the module case.

The insulation cover may include a cover base mounted to the rear surface of the module case; a cover cap configured to protrude by a predetermined length into the module case from the cover base; and an injection guider formed at the cover cap to guide the fire extinguishing agent of the fire extinguisher.

The insulation cover may have a hot air hole formed in the cover cap and provided at a side opposite to the injection guider.

The injection guider may include a plurality of guide ribs formed by a predetermined length along a longitudinal direction of the cover cap and disposed to be spaced apart from each other by a predetermined distance to form a plurality of openings.

The fire extinguisher may include a unit body connected to the fire extinguishing tank unit; and an injection nozzle provided to the unit body to inject the fire extinguishing agent toward the at least one battery cell inside the module case.

The injection nozzle may include a nozzle body connected to the unit body and having an injection hole for injecting the fire extinguishing agent; and a glass bulb provided to the nozzle body and configured to cover the injection hole, the glass bulb being separated from the injection hole or at least partially broken to open the injection hole when the inside of the module case is exposed to an internal gas above a predetermined temperature.

In addition, the present disclosure provides a battery rack, comprising: at least one battery module according to the former embodiments; and a rack case configured to accommodate the at least one battery module.

Moreover, the present disclosure provides an energy storage system, comprising at least one battery rack according to the former embodiment.

Advantageous Effects

According to various embodiments as above, it is possible to provide a battery module, which may block a thermal runaway when the thermal runaway occurs due to an abnormal situation, and a battery rack and an energy storage system including such a battery module.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
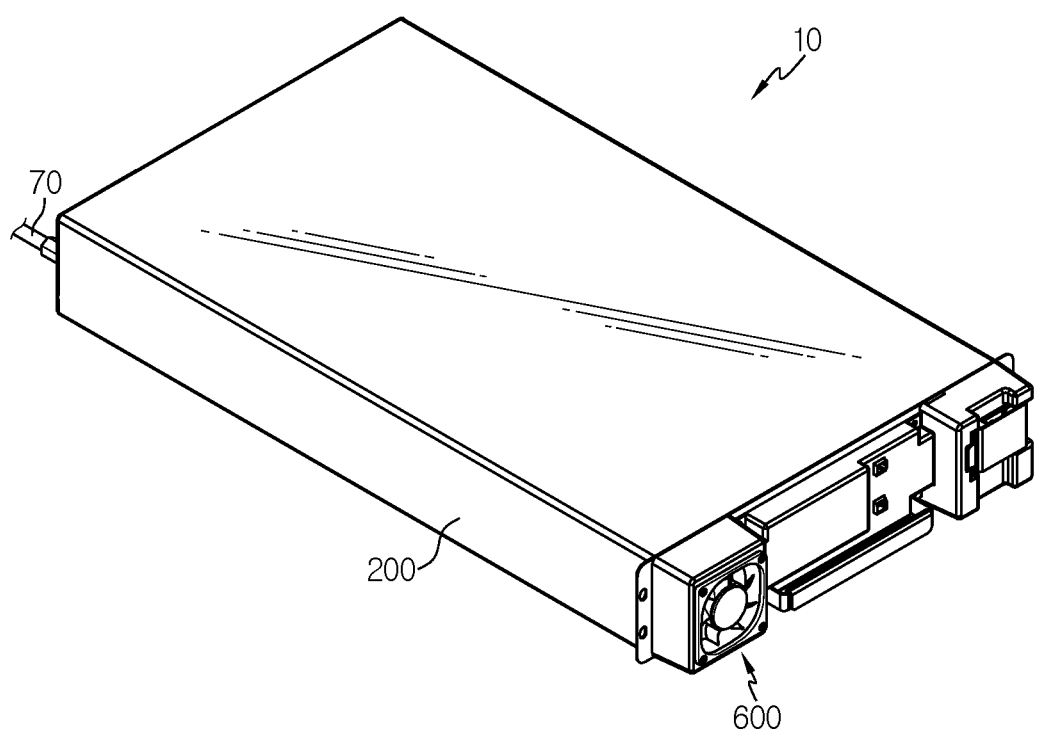
FIG. 1 is a diagram for illustrating a battery module according to an embodiment of the present disclosure.
Figure 2:
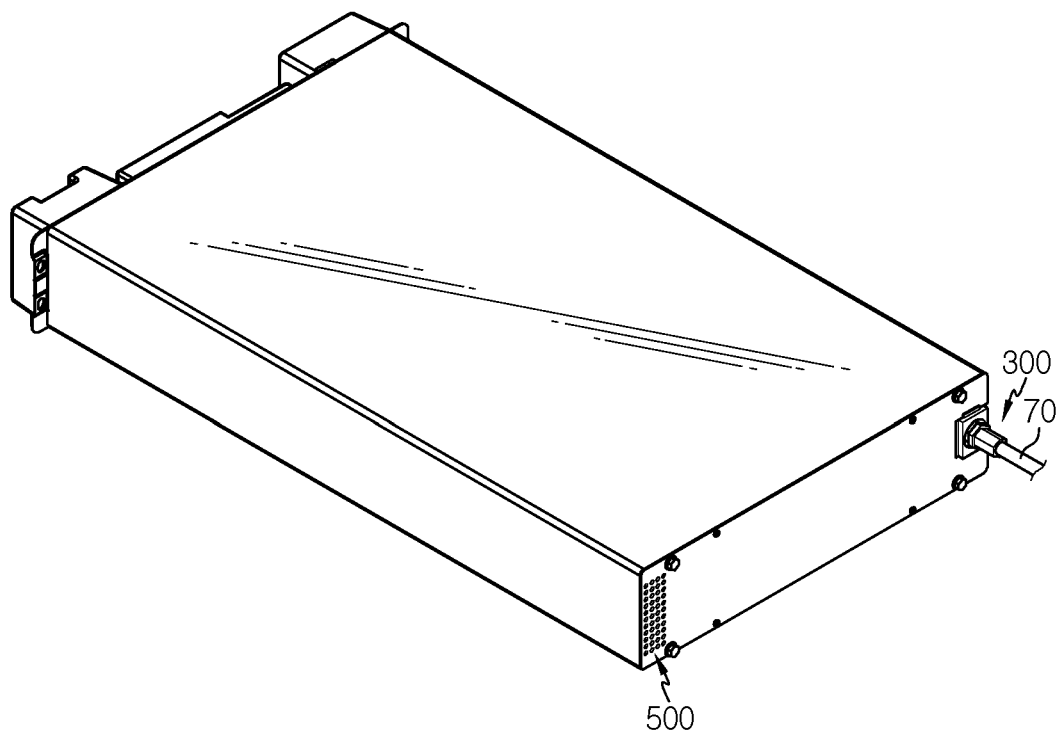
FIG. 2 is a rear perspective view showing the battery module of FIG. 1.
Figure 3:
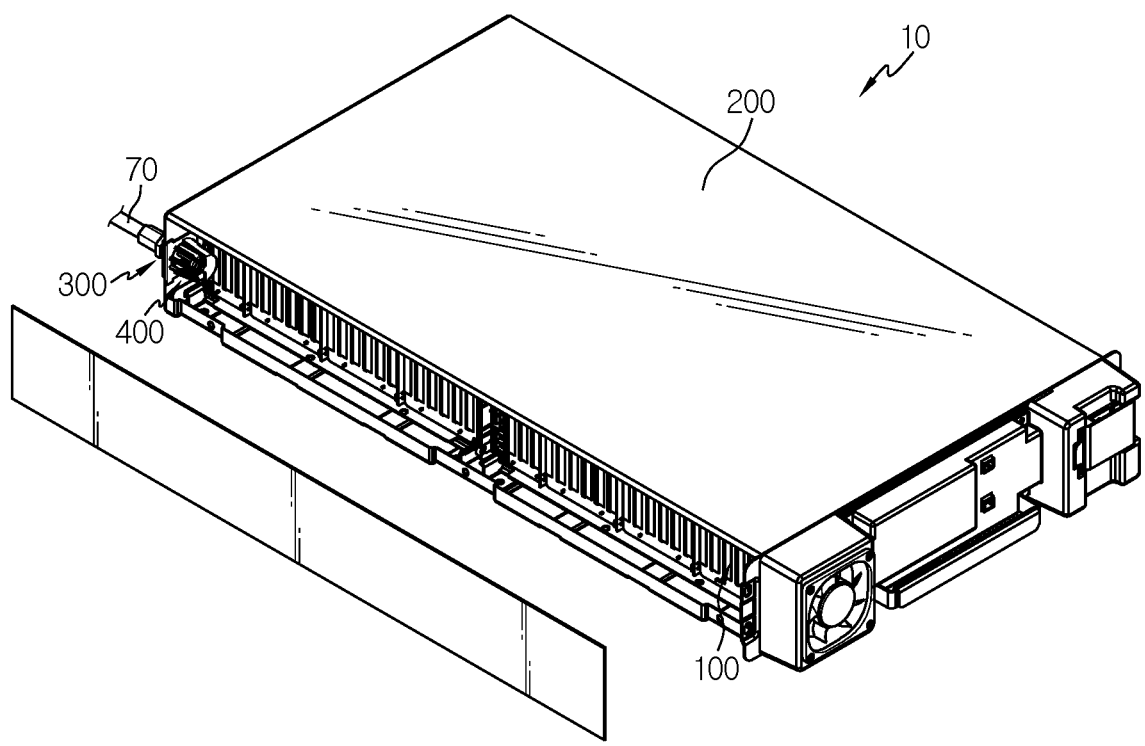
FIG. 3 is a partially exploded view showing the battery module of FIG. 1.

FIG. 1 is a diagram for illustrating a battery module according to an embodiment of the present disclosure, FIG. 2 is a rear perspective view showing the battery module of FIG. 1, and FIG. 3 is a partially exploded view showing the battery module of FIG. 1.

Referring to FIGS. 1 to 3, a battery module 10 may include a battery cell 100, a module case 200, a fire extinguishing unit 300 and an insulation cover 400.

The battery cell 100 is a secondary battery and may be provided as a pouch-type secondary battery, a rectangular secondary battery or a cylindrical secondary battery. Hereinafter, in this embodiment, it will be described that the battery cell 100 is a pouch-type secondary battery.

One battery cell 100 or a plurality of battery cells 100 may be provided. Hereinafter, in this embodiment, it will be described that a plurality of battery cells 100 are provided.

The module case 200 may accommodate the at least one battery cell 100 or the plurality of battery cells 100 therein. For this, the module case 200 may have an accommodation space for accommodating the plurality of battery cells 100.

The module case 200 may have an insulation cover mounting portion 205.

The insulation cover mounting portion 205 is provided at the rear of the module case 200 and may have an opening of a predetermined size. An insulation cover 400 may be mounted to the insulation cover mounting portion 205 so that the fire extinguishing unit 300, explained later, is mounted through the insulation cover 400.

The fire extinguishing unit 300 is at least partially disposed inside the module case 200 and is connected to a fire extinguishing tank unit T (see FIG. 13) containing a fire extinguishing agent, and the fire extinguishing unit 300 may inject the fire extinguishing agent directly into the module case 200 when a thermal runaway or fire occurs at the at least one battery cell 100. As an example, the fire extinguishing agent may be water.

The fire extinguishing unit 300 may be connected to the fire extinguishing tank unit T through a fire extinguishing agent supply pipe 70. The fire extinguishing unit 300 may be disposed to be at least partially surrounded by the insulation cover 400, explained later, inside the module case 200. That is, the fire extinguishing unit 300 may at least partially pass through the module case 200 and be disposed at an inner side of the insulation cover 400, explained later, inside the module case 200.

In this embodiment, since the fire extinguishing unit 300 injects the fire extinguishing agent directly into the module case 200, when a fire occurs at the battery cells 100 in the battery module 10, the fire may be extinguished more quickly and effectively at an early stage.

Hereinafter, the fire extinguishing unit 300 and the insulation cover 400 covering the fire extinguishing unit 300 according to this embodiment will be described in more detail.

Figure 4:
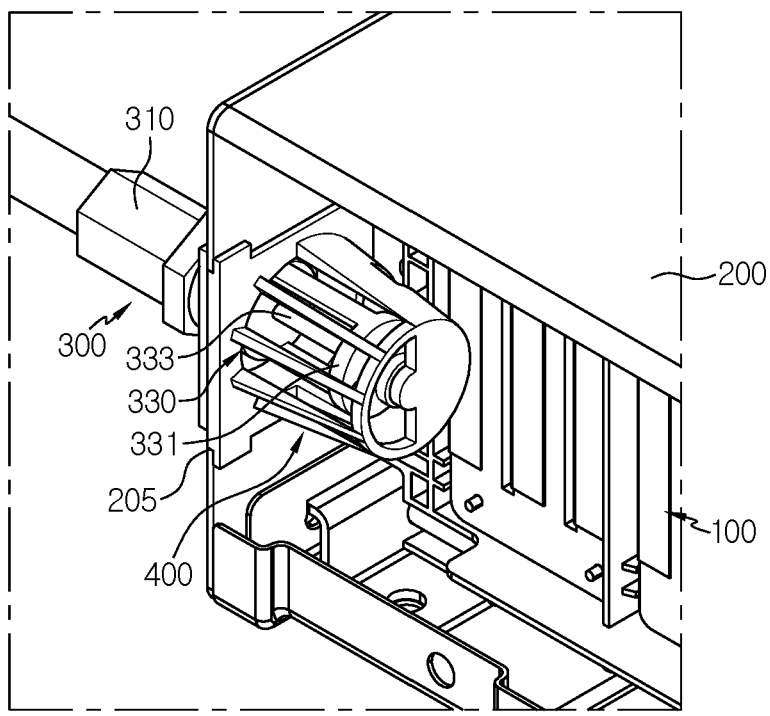
FIG. 4 is an enlarged view showing a main part of the battery module of FIG. 3.
Figure 5:
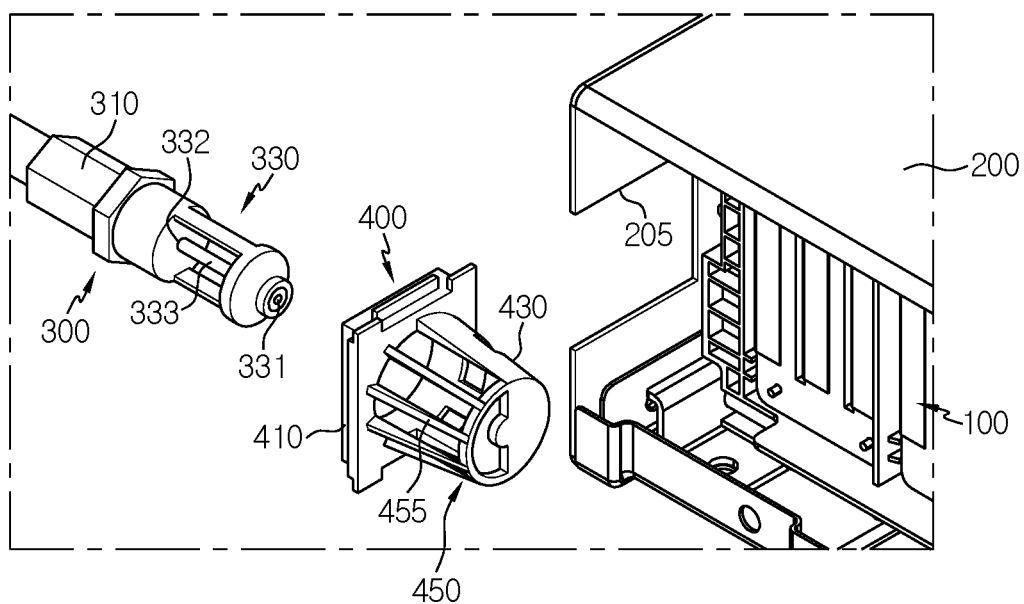
FIG. 5 is a partially exploded perspective view showing the battery module of FIG. 4.
Figure 6:
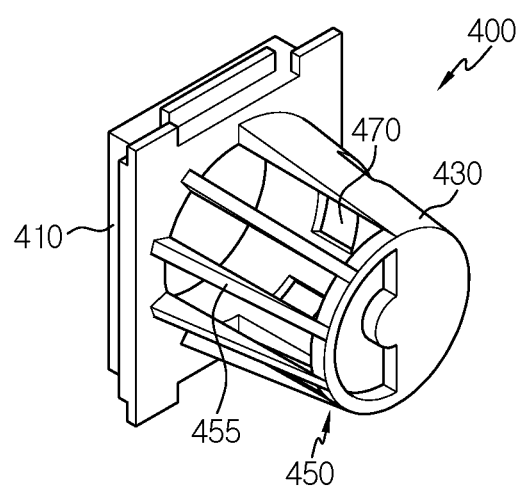
FIGS. 6 and 7 are diagrams for illustrating an insulation cover of the battery module of FIG. 5.
Figure 7:
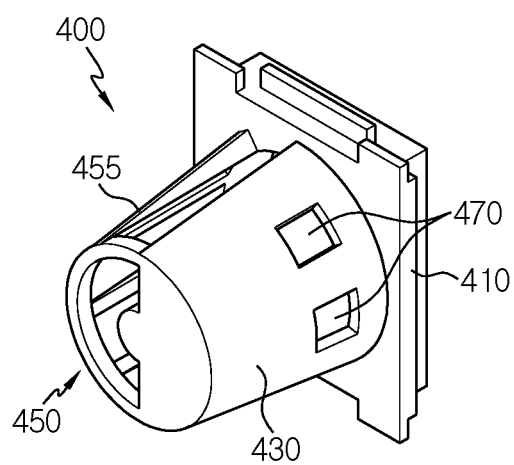
Figure 8:
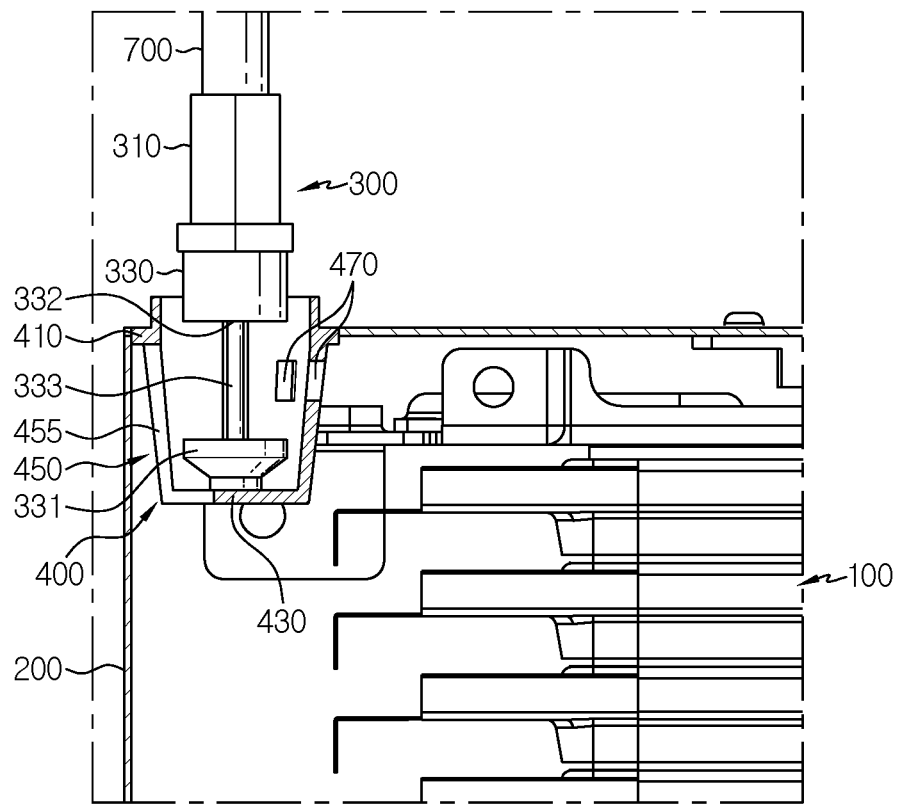
FIG. 8 is a sectional view showing a main part of the battery module of FIG. 1.

FIG. 4 is an enlarged view showing a main part of the battery module of FIG. 3, FIG. 5 is a partially exploded perspective view showing the battery module of FIG. 4, FIGS. 6 and 7 are diagrams for illustrating an insulation cover of the battery module of FIG. 5, and FIG. 8 is a sectional view showing a main part of the battery module of FIG. 1.

Referring to FIGS. 4 to 8, the fire extinguishing unit 300 may include a unit body 310 and an injection nozzle 330.

Figure 13:
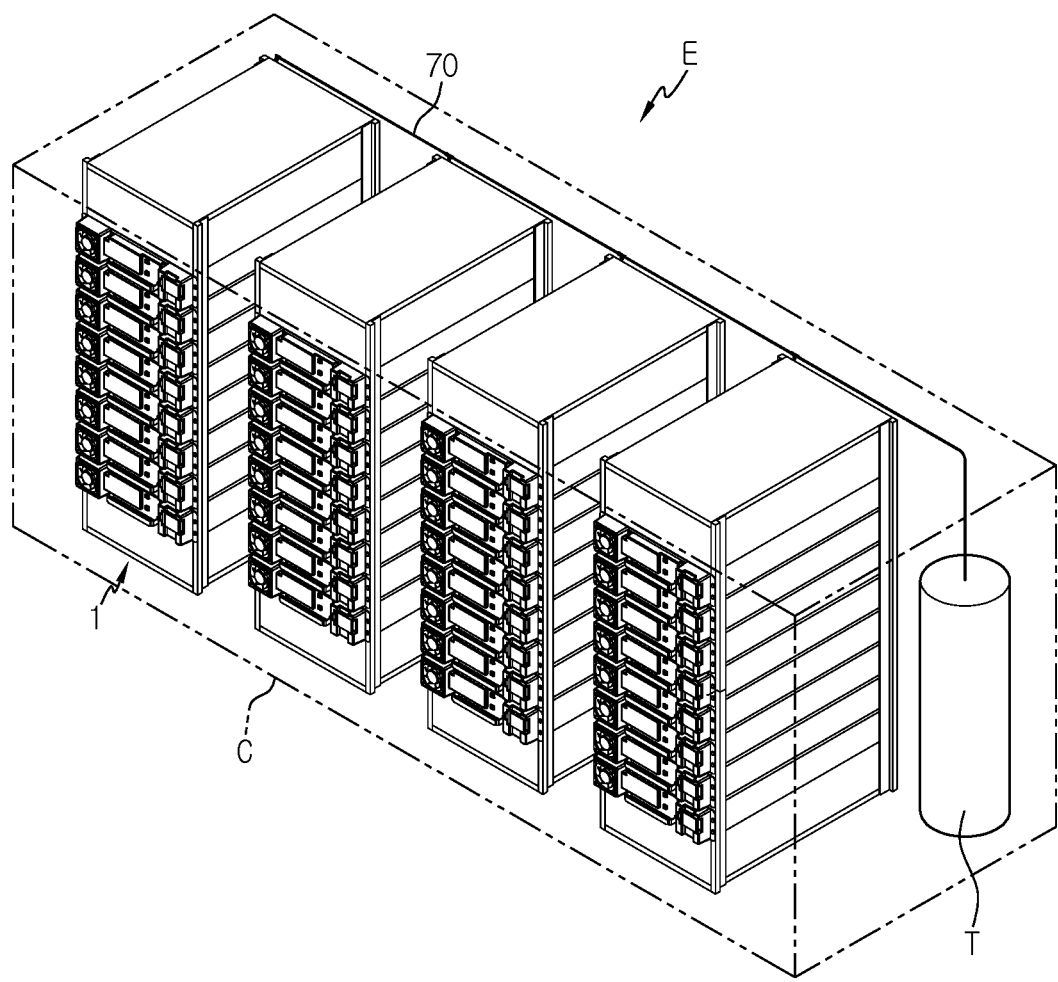
FIG. 13 is a diagram for illustrating an energy storage system according to an embodiment of the present disclosure.

The unit body 310 may be connected to the fire extinguishing tank unit T (see FIG. 13). Specifically, the unit body 310 has an internal channel for storage and flow of the fire extinguishing agent and may be connected to the fire extinguishing tank unit T (see FIG. 13), explained later, through the fire extinguishing agent supply pipe 70.

The injection nozzle 330 is provided to the unit body 310 and may be disposed at the inner side of the module case 200 to inject the fire extinguishing agent toward the battery cells 100 inside the module case 200.

The injection nozzle 330 may include a nozzle body 331 and a glass bulb 333.

The nozzle body 331 is connected to the unit body 310, and specifically, may be mounted to the unit body 310 to communicate with the internal channel of the unit body 310.

The nozzle body 331 may have an injection hole 332.

The injection hole 332 is for injection of the fire extinguishing agent and may communicate with the internal channel of the unit body 310. When the injection hole 332 is opened, the fire extinguishing agent may be injected to the outside.

The glass bulb 333 is provided to the nozzle body 331 and is configured to cover the injection hole 332. Also, when the module case 200 is exposed to an internal gas above a predetermined temperature, the glass bulb 333 may be configured to be separated from the injection hole 332 or at least partially broken to open the injection hole 332.

The glass bulb 333 is filled with a predetermined substance such as a predetermined liquid or gas. Such a predetermined material may have a property of increasing the volume as the temperature increases. Specifically, the glass bulb 333 may be broken due to the volume expansion of the predetermined material, melted, or separated from the nozzle body 331 above a predetermined temperature, for example 70° C. to 100° C. or higher to open the injection hole 332.

The insulation cover 400 is for protecting the fire extinguishing unit 300 and may be configured to cover the fire extinguishing unit 300 at least partially. Also, the insulation cover 400 may be at least partially disposed inside the module case 200. Specifically, the insulation cover 400 is mounted to a rear surface of the module case 200 and may be disposed to cover the injection nozzle 330 of the fire extinguishing unit 300 at least partially.

The insulation cover 400 may be made of an insulating material. By means of the insulation cover 400, it is possible to secure insulation between the fire extinguishing unit 300 and an internal circuit or the like inside the module case 200.

The insulation cover 400 may include a cover base 410, a cover cap 430, an injection guider 450, and a hot air hole 470.

The cover base 410 may be mounted to the rear surface of the module case 200. Specifically, the cover base 410 may be mounted to the insulation cover mounting portion 205 of the module case 200.

The cover cap 430 may protrude into the module case 200 from the cover base 410 by a predetermined length and at least partially cover the injection nozzle 330 of the fire extinguishing unit 300.

The injection guider 450 is formed at the cover cap 430 and may guide the fire extinguishing agent of the fire extinguishing unit 300 to be injected. The injection guider 450 may be formed to open a front part and a side part of the cover cap 430.

The injection guider 450 may include a plurality of guide ribs 455.

The plurality of guide ribs 455 may be formed to have a predetermined length along a longitudinal direction of the cover cap 430, and may be spaced apart from each other by a predetermined distance to form a plurality of openings. The plurality of guide ribs 455 may guide air to be introduced into the cover cap 430 and guide the injection of the fire extinguishing agent when the fire extinguishing agent, explained later, is injected.

The hot air hole 470 is formed in the cover cap 430 and may be provided at a side opposite to the injection guider 450. At least one hot air hole 470 or a plurality of hot air holes 470 may be provided, and the hot air hole 470 may be provided in a hole shape of a predetermined size.

The hot air hole 470 may function as a hot air passage to ensure smooth heat transfer within the cover cap 430 of the insulation cover 400. When a thermal runaway, explained later, occurs, the hot air hole 470 may secure smooth heat transfer inside the cover cap 430 of the insulation cover 400, which may guide the glass bulb 333 to be broken, melted or separated over a predetermined temperature more quickly so that the injection hole 332 is opened for injection of the fire extinguishing agent.

Meanwhile, the battery module 10 may include a cooling air discharge unit 500 and a cooling air supply unit 600.

The cooling air discharge unit 500 is disposed to be spaced apart from the insulation cover 400 and the fire extinguishing unit 300 by a predetermined distance, and may be formed at the rear surface of the module case 200.

At the rear of the module case 200, the cooling air discharge unit 500 may be provided at a side opposite to the insulation cover mounting portion 205. A lower end of the cooling air discharge unit 500 may be provided to have a predetermined height from a lower end of the rear surface of the module case 200.

The cooling air discharge unit 500 has a plurality of discharge holes and may be provided above the predetermined height. Accordingly, when the fire extinguishing agent is injected into the module case 200, explained later, it is possible to secure a predetermined water level at which the fire extinguishing agent may be filled up to the predetermined height inside the module case 200, thereby suppressing the thermal runaway or fire situation more effectively.

The cooling air supply unit 600 is provided at the front of the module case 200, and may supply a cooling air into the module case 200 of the battery module 10 in order to cool the battery cells 100. The cooling air supply unit 600 may be disposed diagonally to the cooling air discharge unit 500 in order to increase the cooling circulation efficiency.

Hereinafter, the fire extinguishing agent injection mechanism inside the module case 200 according to this embodiment when a fire or thermal runaway occurs in the battery module 10 will be described in more detail.

Figure 9:
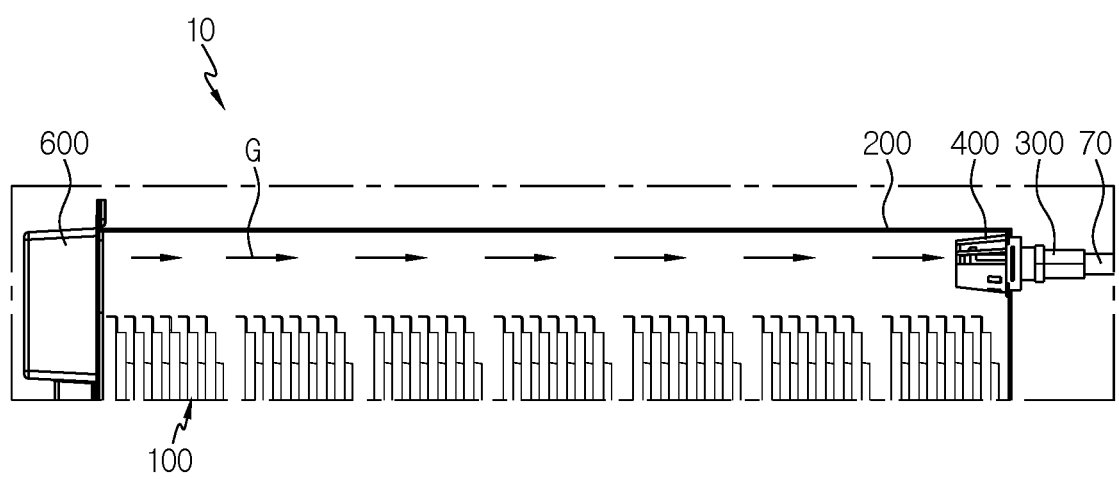
FIGS. 9 to 11 are diagrams for illustrating a fire extinguishing agent injection mechanism inside a module case when a thermal runaway or fire occurs in the battery module of FIG. 1.
Figure 10:
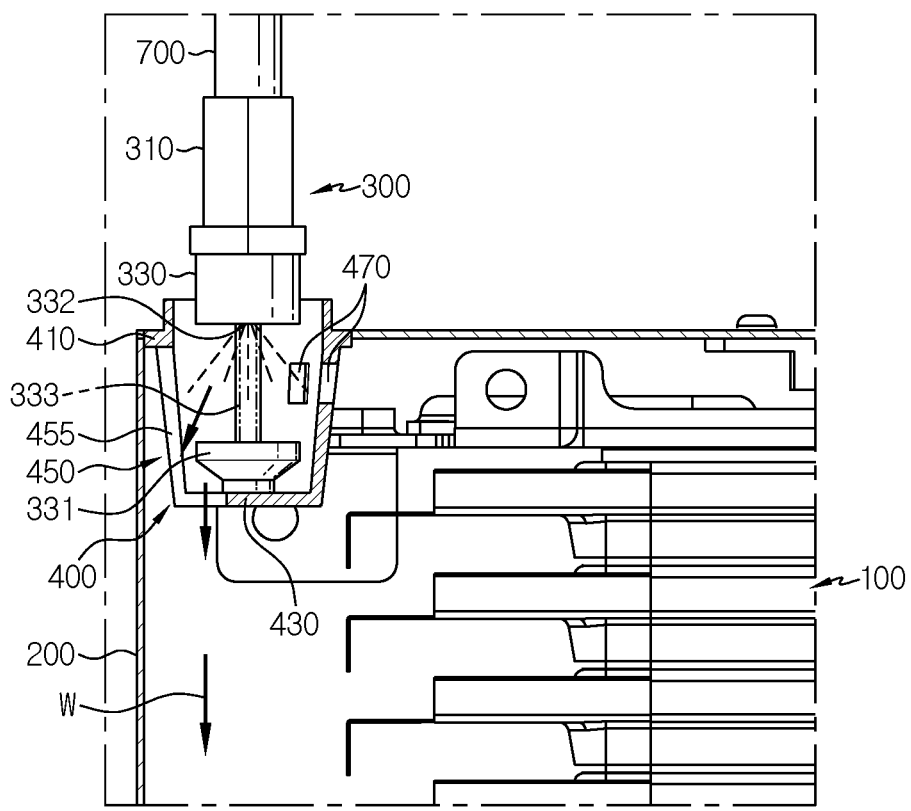
Figure 11:
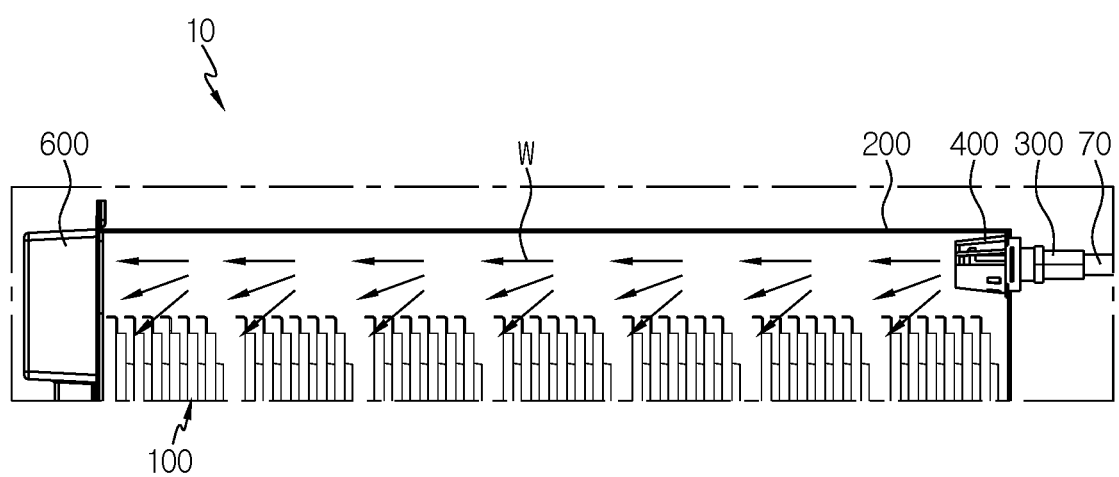

FIGS. 9 to 11 are diagrams for illustrating a fire extinguishing agent injection mechanism inside a module case when a thermal runaway or fire occurs in the battery module of FIG. 1.

Referring to FIGS. 9 to 11, a fire situation or a thermal runaway situation caused by overheating or the like may occur at the battery cells 100 inside the module case 200 of the battery module 10, due to an abnormal situation of at least one battery cell 100. If the fire or thermal runaway situation occurs, a high-temperature gas G may be generated inside the module case 200 due to an overheated battery cell 100.

Due to the high-temperature gas G, the glass bulb 333 of the fire extinguishing unit 300 is broken or melted, or the glass bulb 333 is separated from the nozzle body 331, thereby opening the injection hole 332 so that the fire extinguishing agent may be injected. As the injection hole 332 is opened, the fire extinguishing agent W, namely water W, inside the fire extinguishing unit 300 may be immediately and directly injected toward the battery cells 100.

Accordingly, in this embodiment, when a fire situation or a thermal runaway situation occurs in the battery module 10, the fire extinguishing agent is immediately and directly injected toward the battery cells 100 inside the module case 200 by means of the fire extinguishing unit 300, thereby suppressing the fire situation or the thermal runaway situation more quickly at an early stage.

Therefore, in this embodiment, since the fire situation or the thermal runaway situation is suppressed more quickly at an early stage, it is possible to more effectively prevent the occurrence of a dangerous situation such as a secondary explosion caused by heat or flame transfer to neighboring battery cells 100 in advance.

Figure 12:
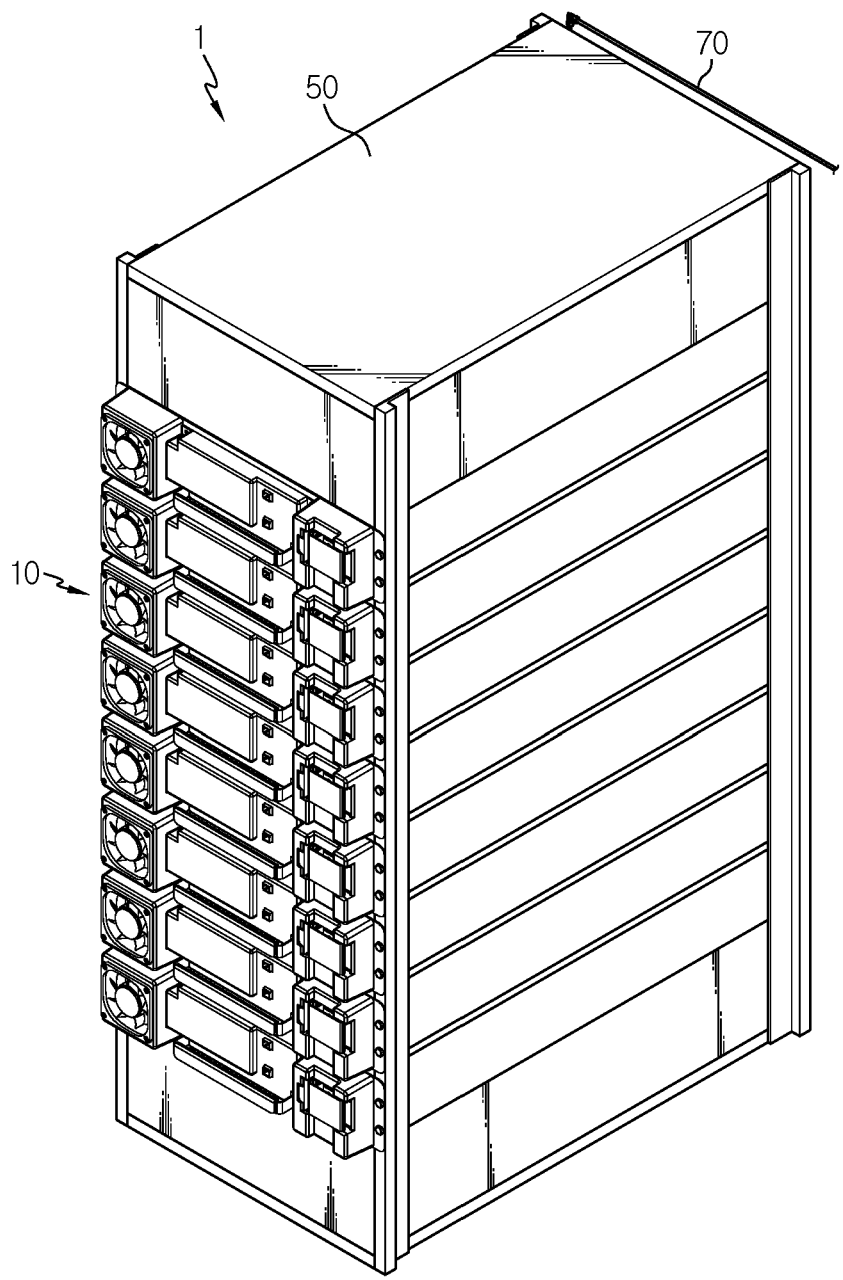
FIG. 12 is a diagram for illustrating a battery rack according to an embodiment of the present disclosure.

FIG. 12 is a diagram for illustrating a battery rack according to an embodiment of the present disclosure.

Referring to FIG. 12, a battery rack 1 may include a plurality of battery modules 10 of the former embodiment, a rack case 50 for accommodating the plurality of battery modules 10, and a fire extinguishing agent supply pipe 70 connected to the plurality of battery modules 10.

The fire extinguishing agent supply pipe 70 may communicate with the fire extinguishing unit 300 and the fire extinguishing tank unit T (see FIG. 13), explained later, so that when an abnormal situation such as fire occurs in at least one of the plurality of battery modules 10, the fire extinguishing agent of the extinguishing tank unit T may be guided to be supplied toward the battery module 10 where the abnormal situation has occurred.

Since the battery rack 1 according to this embodiment includes the battery module 10 of the former embodiment, the battery rack 1 may have all the advantages of the battery module 10 of the former embodiment.

FIG. 13 is a diagram for illustrating an energy storage system according to an embodiment of the present disclosure.

Referring to FIG. 13, an energy storage system E may be used for home or industrial use, as an energy source. The energy storage system E may include at least one battery rack 1 of the former embodiment, or a plurality of battery racks 1 in the case of this embodiment, and a rack container C for accommodating the plurality of battery racks 1.

The rack container C may include the fire extinguishing tank unit T for supplying the fire extinguishing agent to the plurality of battery racks 1. The fire extinguishing tank unit T is filled with the fire extinguishing agent, namely water. The fire extinguishing tank unit T may be connected to the plurality of battery racks 1 through the fire extinguishing agent supply pipe 70 to supply the fire extinguishing water toward the plurality of battery racks 1.

Since the energy storage system E according to this embodiment includes the battery rack 1 of the former embodiment, the energy storage system E may have all the advantages of the battery rack 1 of the former embodiment.

According to various embodiments as described above, it is possible to provide a battery module 10 capable of extinguishing a thermal runaway or fire more quickly at an early stage more quickly when a thermal runaway occurs inside the battery module 10 or a fire occurs due to the thermal runaway, and to provide a battery rack 1 including the battery module 10 and an energy storage system E including the battery rack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   at least one battery cell;
   a module case configured to accommodate the at least one battery cell;
   a fire extinguisher disposed at least partially inside the module case and configured to be connected to a fire extinguishing tank containing a fire extinguishing agent to inject the fire extinguishing agent directly into the module case when a thermal runaway or fire occurs in the at least one battery cell; and
   an insulation cover configured to at least partially cover the fire extinguisher and disposed at least partially inside the module case,
   wherein the insulation cover includes:
   a cover base mounted to the rear surface of the module case;
   a cover cap formed by a solid wall and configured to protrude by a predetermined length into the module case from the cover base;
   an injection guider formed at the cover cap having at least one opening to guide the fire extinguishing agent of the fire extinguisher; and
   a hot air hole formed in the cover cap and provided at a side opposite to the injection guider,
   wherein the at least one opening is larger than the hot air hole.

2. The battery module according to claim 1, wherein the insulation cover is mounted to a rear surface of the module case, and
   wherein the rear surface of the module case has an insulation cover mounting portion so that the insulation cover is mounted thereto.

3. The battery module according to claim 2, wherein the fire extinguisher at least partially passes through the module case and is disposed at an inner side of the insulation cover inside the module case.

4. The battery module according to claim 1, wherein the at least one opening is a plurality of openings,
   wherein the injection guider includes a plurality of guide ribs formed by a predetermined length along a longitudinal direction of the cover cap and disposed to be spaced apart from each other by a predetermined distance to form the plurality of openings.

5. The battery module according to claim 1, wherein the fire extinguisher includes:
   a body connected to the fire extinguishing tank; and
   an injection nozzle provided to the body to inject the fire extinguishing agent toward the at least one battery cell inside the module case.

6. The battery module according to claim 5, wherein the injection nozzle includes:
   a nozzle body connected to the body and having an injection hole for injecting the fire extinguishing agent; and
   a glass bulb provided to the nozzle body and configured to cover the injection hole, the glass bulb being separated from the injection hole or at least partially broken to open the injection hole when the inside of the module case is exposed to an internal gas above a predetermined temperature.

7. A battery rack, comprising:
   at least one battery module as defined in claim 1; and
   a rack case configured to accommodate the at least one battery module.

8. An energy storage system, comprising at least one battery rack as defined in claim 7.

9. The battery module according to claim 4, wherein the plurality of openings extend an entire length of the insulation cover in the longitudinal direction.

* * * * *